UNITED STATES PATENT OFFICE.

THOMAS JESPERSEN, OF NEENAH, WISCONSIN.

METHOD OF REMOVING PRINTERS' INK FROM PAPER-STOCK.

1,311,563.  Specification of Letters Patent.  Patented July 29, 1919.

No Drawing.  Application filed December 11, 1916.  Serial No. 136,132.

*To all whom it may concern:*

Be it known that I, THOMAS JESPERSEN, a citizen of the United States, residing at Neenah, county of Winnebago, State of Wisconsin, have invented a new and useful Improvement in Methods of Removing Printers' Ink from Paper-Stock, of which the following is a specification.

My method consists substantially in treating paper stock with calcium hydroxid, and also in certain additional steps which will be more fully described hereinafter.

In the practice of my invention the waste paper stock, such as newspapers and other paper printed with ink containing a mineral oil vehicle is macerated in a suitable apparatus, such as a beater, and reduced to a pulp. Either before or after the stock is reduced to a pulp I add thereto calcium hydroxid, commonly known as milk of lime, and continue the beating until the mineral oil rises to the surface, carrying with it the pigment of the ink, forming a dark oily layer. This layer may be removed by any suitable method, as for instance by means of the usual rotating screens.

The calcium hydroxid is preferably prepared shortly before use by slaking quicklime in a well known manner. It is added to the stock preferably before the latter has already been reduced to pulp.

I desire to be understood that my method is not intended for use with paper stock containing printers' ink in which the vehicle consists entirely of vegetable oils or contains no mineral oil, as the calcium hydroxid would form with the vegetable oil a water insoluble calcium soap.

The following example illustrates the application of my method:

Fifty (50) pounds of quicklime are slaked in the usual manner to convert it into calcium hydroxid. All the calcium hydroxid thus obtained is properly screened through a fine screen, and then placed into a beater containing about four thousand (4000) gallons of water. The water may be used at ordinary temperature although the operation is expedited by the application of heat. Then about one (1) ton of newspaper stock, as specified, is placed into the beater, and the beating operation is continued until the mineral oil, carrying the pigment, has risen to the surface. The mineral oil is then removed by the well known rotary screens, fresh water being added to the beater to replace the fluid which has been removed by the screens.

Thereafter the pulp which has thus been substantially freed from the printers' ink, is dropped into the cistern, from there removed to the usual second beater where it is mixed with the size, and with the mordant which is usually alum, and if desired, with coloring matter; and from the second beater the pulp is removed to the Jordan engine and the box and finally run upon the wire screens of the paper machine.

It is, of course, obvious that I may vary the proportions hereinabove specified without departing from the spirit of my invention, and it is also obvious that different proportions will be indicated as conditions of operation differ. For instance, a harder water, containing more carbonic acid gas, will require a greater amount of calcium hydroxid, as may also different kinds of paper, or paper containing greater quantities of ink. But the best proportions can readily be ascertained by anyone skilled in the art by observing the results obtained. Preferably enough calcium hydroxid should be used to maintain an alkaline re-action in the beater at all times until the operation is concluded, and any excess then present may be removed during the washing operation.

I may also, after having removed the printers' ink from the paper, omit the step of actually removing from the beater the mineral oil and its contained pigment, but may mix the latter with the paper, for instance by dropping both into the cistern. In this case I should obtain a slightly colored paper which is suitable for many purposes, for instance for receiving impressions with printers' ink.

I have frequently found that when the pulp is being laid upon the wire screens bubbles appear upon the surface of the layer, and that the new paper shows undesirable marks at the places where such bubbles appeared. These bubbles are caused by carbonic acid gas formed mainly by the re-action of sulfuric acid, contained as an impurity in commercial alum, with carbonate of calcium present in the pulp; although it is possible that some of the gas is liberated by a re-action which may take place between the carbonate of calcium and the alum. This carbonate of calcium is formed during the treatment of the pulp with calcium hydroxid, some of the latter substance having combined with carbon dioxid, present in the atmosphere or held in solution in the water in the beater, and possibly with carbon dioxid chemically combined with the wood fiber in the paper. I have found that I can obviate the formation of bubbles by adding a suitable acid in sufficient amount to the pulp before adding the alum and size, to neutralize the carbonate of calcium. The acid is added preferably in the first beater, so that the carbonic acid gas formed by the re-action of the acid with the carbonate of calcium may have ample time to escape while the pulp is in such beater and in the cistern.

While I may use hydrochloric acid, or nitric acid, for this purpose, I prefer to use sulfuric acid because such acid forms with the carbonate of calcium an insoluble sulfate of calcium which will settle upon the fibers of the pulp and give them a whiter appearance. Thus by the use of sulfuric acid I not only overcome the defects due to the presence of carbonate of calcium, but actually convert that substance into one which adds materially to the value of the new paper.

The step of adding an acid to the pulp may be useful in connection with processes not involving the use of calcium hydroxid for removing printers' ink. The formation of bubbles, known in the art as "foaming," is of fairly common occurrence. When this is caused by the presence of an alkali in the pulp mixture the addition of an acid would act as a preventive in many cases; and when this is caused by the presence of carbonate of calcium due to causes other than those arising from the deliberate use of calcium hydroxid (for instance from the use of the sediment of hypochlorite of lime used as a bleaching agent) the use of sulfuric acid would have all of the advantage hereinabove specified.

When I speak in my claims of "waste paper stock as specified" I refer to paper stock containing printers' ink in which the vehicle consists in whole or in part of mineral oil.

I claim:

1. The process of removing ink from waste paper stock as specified comprising treating said stock with calcium hydroxid, substantially as and for the purpose described.

2. The process of removing ink from waste paper stock as specified comprising treating said stock with calcium hydroxid, and then with a suitable acid, substantially as and for the purpose described.

3. The process of removing ink from waste paper stock as specified comprising treating said stock with calcium hydroxid and then with sulfuric acid, substantially as and for the purpose described.

4. In the process of paper making, the step of preventing foaming when caused by the presence of a substance which can be neutralized by an acid, that step which comprises the addition of a suitable acid to the pulp, substantially as and for the purpose described.

5. In the process of paper making the step, which comprises the addition of sulfuric acid to pulp containing carbonate of calcium, substantially as and for the purpose described.

In testimony whereof I have hereunto set my hand.

THOMAS JESPERSEN.